June 6, 1950  E. T. JANSSON  2,510,581
MILKING MACHINE
Filed March 16, 1946

INVENTOR
ERNST T. JANSSON
BY
Buser and Harding
ATTORNEYS

Patented June 6, 1950

2,510,581

UNITED STATES PATENT OFFICE 2,510,581

MILKING MACHINE

Ernst Tage Jansson, Stockholm, Sweden, assignor to Aktiebolaget Separator, Stockholm, Sweden, a corporation of Sweden Application March 16, 1946, Serial No. 654,905
In Sweden April 14, 1945

4 Claims. (Cl. 31—62)

With milking machines of the type whose pulsator is detachably connected with the cover of the milk pail and is secured during the operation between the cover and a handle fixed thereto, the two pulsation hose extend from the pulsator proper. As, on the other hand, the milk hose must be connected to a hose nipple of the cover, and as the pulsation hose and the milk hose should be combined in a single unit, it will be understood that the pulsator cannot be removed from the cover unless the pulsation hose or the milk hose are also removed from their nipples.

According to the invention, the removal of the pulsator independently of the pulsation hose is rendered possible by providing pulsation channels in the cover proper or in a part permanently fixed to it, the outer ends of which channels are each provided with hose nipples and the inner ends of which are connectable to corresponding channels in the pulsator. The pulsator may then be applied, as a separate unit, to the cover, preferably over the centre of the cover and secured between the cover and the handle, being thus removable from the cover without the necessity of detaching the hose, as above specified.

Figure 1:
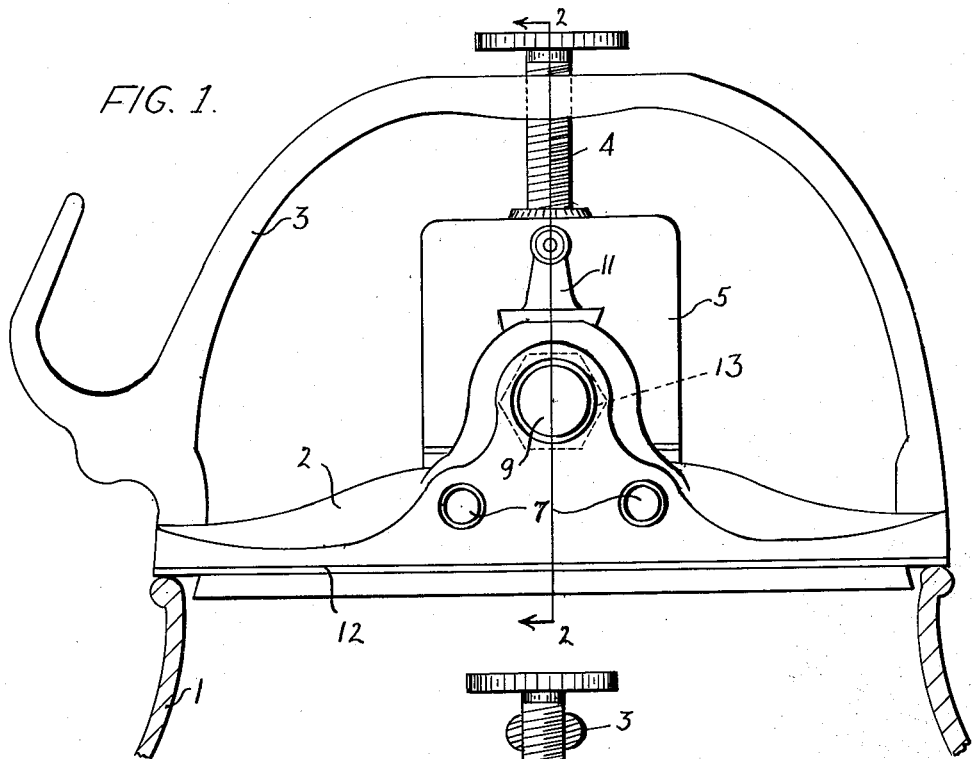
Fig. 1 is a vertical sectional view of the upper part of a milk pail, with cover and pulsator applied thereto and shown in side elevation.

The milk pail 1 has a cover 2, provided with a handle 3, which maintains the pulsator 5 secured to the upper portion of the cover by means of a screw 4.

Figure 2:
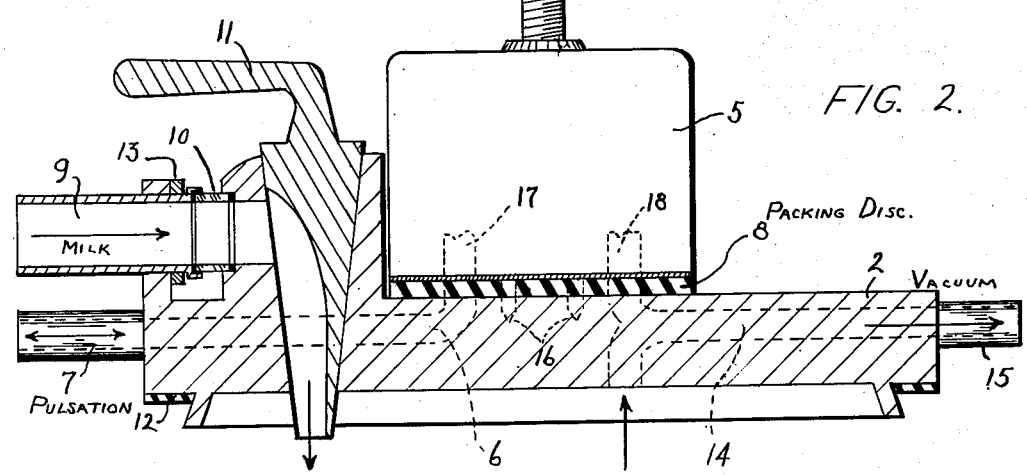
Fig. 2 is a sectional view on line 2—2 in Fig. 1.

The two pulsator channels in the pulsator (one of which channels, 17, is shown in Fig. 2) are so located that when the pulsator is applied to the cover such channels will register with pulsator channels 6 formed in the cover 2. To insure exact registration the pulsator may have affixed thereto two locating pins 16 adapted to seat in holes in the cover.

The pulsator channels 6, 6 terminate at the side of the cover in nipples 7, 7, to which the ends of two pulsation hose (not shown) are adapted to be applied.

Between and above the two nipples 7, 7 is a nipple 9, to which the end of a milk hose is adapted to be applied. The nipple 9, through a sight glass tube 10, communicates with a valve chamber, in the cover, opening into the interior of the milk pail and controlled by the milk cock 11, the latter being arranged in a raised portion of the cover adjacent the flat portion of the cover which forms a seat for the pulsator. The nipples 7, 7 and 9 are arranged in close proximity and extend from the cover in the same direction.

Formed in the cover 2 is a vacuum channel 14 terminating in a nipple 15, to which the end of the vacuum hose (not shown) is adapted to be applied. One fork of the vacuum channel opens into the interior of the milk pail. The other fork registers with a vacuum channel, 18, in the pulsator, when the latter is applied to the cover 2 as hereinbefore described.

Tight joints between the channels in the cover 2 and the passages in the pulsator are made by means of one or more packing discs 8 arranged between the pulsator and the cover.

A sealing ring 12 is provided between the pail and cover. By means of a nut 13 the milk tube nipple 9 and the glass sight tube 10 are maintained in operative relation with the main portion of the cover.

The pulsator 5 may be any of the known automatic pulsators that operate by the difference between atmospheric pressure and the "vacuum" (usually about one half atmospheric pressure) in passage 14; channels 6 being connected, in operation, one with vacuum and the other with the atmosphere, the connections being then reversed. The pulsator, of course, has its two pulsation passages and its single vacuum passage terminal in position to register with the three openings in the pail top communicating with the channels 6, 6 and 14.

From the foregoing description it will be understood that the pulsator is readily removable from the cover without the necessity of removing the pulsation hose from their nipples or the milk hose from its nipple, and that when the pulsator is applied to the pail the necessity does not arise of applying the pulsator hose thereto.

What I claim and desire to protect by Letters Patent is:

1. In a milking machine, the combination with the milk pail, its cover, and a pulsator removable in its entirety as a unit from the cover, the cover having a passage therein communicating with the interior of the pail, a nipple communicating with said passage and adapted for connection with a milk outlet hose, the cover having a channel adapted for connection with a source of vacuum and having forks one communicating with the interior of the pail and the other with an opening in the top of the cover, said cover having also two pneumatic pulsation channels each opening at one end in the top of the cover, a nipple at the other end of each pulsator channel adapted for hose connection, the pulsator unit having three openings in its bottom adapted, when the pulsator is mounted on the cover, to register respectively with the end openings in said channels.

2. The combination defined in claim 1 in which the said three nipples are arranged at one side of the pail cover in close proximity and in substantial prallelism.

3. The combination defined in claim 1 in which the two pulsation channels and their respective nipples are arranged in substantially parallel relation and in which the nipple for milk passage is arranged between and above and in substantially parallel relation with the other two nipples.

4. In a milking machine, the combination of a cover for the milk pail, the cover having a raised portion adjacent one side thereof and also a flat portion extending laterally from the raised portion, the cover having in said raised portion a valve controlled passage adapted to communicate with the interior of the pail, a nipple communicating with said passage above the level of said flat portion and adapted for connection with a milk outlet hose, the cover having below said level a channel adapted for connection with a source of vacuum and having forks one opening downwardly through the bottom of the cover and the other opening upwardly through said flat portion, the cover having also two pneumatic pulsation channels extending on opposite sides of the valve controlled passage below said level and each opening upwardly at one end through said flat portion, nipples at the other ends of said pulsation channels adapted for hose connection and disposed below and on opposite sides of the milk hose nipple, and a pulsator seated on said flat portion adjacent the raised portion of the cover and removable in its entirety as a unit from the cover, the pulsator unit having three openings in its bottom which register, respectively, with said channel openings through said flat portion.

ERNST TAGE JANSSON.

REFERENCES CITED

The following references are of record in the file of this patent:

UNITED STATES PATENTS

| Number | Name | Date |
|---|---|---|
| 1,266,697 | Macartney | May 21, 1918 |
| 1,383,369 | Babson | July 5, 1921 |
| 2,122,471 | Hulbert | July 5, 1938 |

FOREIGN PATENTS

| Number | Country | Date |
|---|---|---|
| 32,152 | Denmark | Aug. 13, 1923 |